(12) United States Patent
Claudatos et al.

(10) Patent No.: US 8,331,546 B2
(45) Date of Patent: *Dec. 11, 2012

(54) ENHANCED SERVICES PROVIDED USING COMMUNICATION REDIRECTION AND PROCESSING

(75) Inventors: Christopher Claudatos, San Jose, CA (US); William D. Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,535

(22) Filed: Sep. 27, 2011

(65) Prior Publication Data

US 2012/0014518 A1    Jan. 19, 2012

Related U.S. Application Data

(63) Continuation of application No. 11/173,174, filed on Jun. 30, 2005, now Pat. No. 8,059,805.

(51) Int. Cl.
*H04M 3/42* (2006.01)

(52) U.S. Cl. ......... 379/202.01; 379/203.01; 379/204.01; 379/205.01; 379/206.01; 379/207.01; 455/416; 709/204

(58) Field of Classification Search . 379/203.01–207.01
See application file for complete search history.

(56) References Cited

U.S. PATENT DOCUMENTS

| | | | |
|---|---|---|---|
| 5,432,845 A * | 7/1995 | Burd et al. | 379/211.01 |
| 5,784,561 A * | 7/1998 | Bruno et al. | 709/204 |
| 6,028,917 A * | 2/2000 | Creamer et al. | 379/100.01 |
| 6,085,099 A | 7/2000 | Ritter et al. | |
| 6,112,078 A | 8/2000 | Sormunen et al. | |
| 6,249,584 B1 | 6/2001 | Hamalainen et al. | |
| 6,647,255 B1 | 11/2003 | Nilsson | |
| 6,668,044 B1 * | 12/2003 | Schwartz et al. | 379/68 |
| 6,678,516 B2 | 1/2004 | Nordman et al. | |
| 6,721,416 B1 * | 4/2004 | Farrell | 379/265.07 |
| 6,785,704 B1 * | 8/2004 | McCanne | 718/105 |
| 6,870,924 B1 | 3/2005 | Ukon | |
| 6,901,445 B2 * | 5/2005 | McCanne et al. | 709/225 |
| 7,489,947 B2 | 2/2009 | Castrogiovanni et al. | |
| 7,650,140 B2 | 1/2010 | Plumb et al. | |
| 7,680,511 B2 | 3/2010 | Forte | |
| 8,086,255 B2 | 12/2011 | Claudatos et al. | |
| 8,126,133 B1 | 2/2012 | Everingham et al. | |
| 2004/0066916 A1 * | 4/2004 | Brown et al. | 379/88.01 |
| 2004/0170268 A1 * | 9/2004 | Hakusui | 379/211.02 |
| 2008/0292070 A1 * | 11/2008 | Winter et al. | 379/88.14 |

* cited by examiner

*Primary Examiner* — Joseph J Nguyen
(74) *Attorney, Agent, or Firm* — Van Pelt, Yi & James LLP (57) ABSTRACT

Processing a communication is disclosed. A first request to establish communication is received at a redirection node from a requesting communication participant. A destination communication participant associated with the request is determined. A communication session in which the requesting communication participant, the redirection node, and the destination communication participant are participants at the same time is established, including sending from the redirection node to an equipment associated with the destination communication participant a second request to establish communication between the redirection node and the equipment associated with the destination communication participant. A communication session processing feature not provided with respect to the communication session by a telecommunication service provider associated with a service provider network used to establish and provide the communication session is made available to at least one of the requesting communication participant and the destination communication participant.

30 Claims, 8 Drawing Sheets

ENHANCED SERVICES PROVIDED USING COMMUNICATION REDIRECTION AND PROCESSING

CROSS REFERENCE TO OTHER APPLICATIONS

This application is a continuation of co-pending U.S. patent application Ser. No. 11/173,174 entitled ENHANCED SERVICES PROVIDED USING COMMUNICATION REDIRECTION AND PROCESSING filed Jun. 30, 2005 which is incorporated herein by reference for all purposes.

BACKGROUND OF THE INVENTION

Telecommunication processing has been traditionally limited to processing features offered by telecommunications providers. Features such as call forwarding usually require a service agreement with the telecommunications provider to utilize call processing systems maintained by the telecommunications provider. Since telecommunications processing requires the use of communication devices and/or infrastructure beyond the control of the user entity, it is difficult for the user entity to implement new call processing features and/or configure or modify existing services and call processing features. Attempts have been made to implement private telecommunications systems, e.g. PBX (Private Branch Exchange) systems, but they typically lack the ability to extend processing capabilities beyond physically local areas. Also, many desirable processing features have not been available in previous systems. Therefore, there exists a need to enable new ways for telecommunications user entities to implement and control telecommunications processing.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Telecommunications processing is disclosed. In some embodiments, all or a portion of calls associated with a call station are monitored and/or redirected. A call station includes any user, system, and/or device associated with the redirecting and/or otherwise processing a call. For example, in some embodiments all calls from the call station intended to a destination call participant (i.e., any communication user, system, or device) are routed to a call redirection and processing system. Upon receiving a call, the call redirection and processing system calls the destination call participant at a configured forwarding number and conferences the received call with the call to the destination call participant. Further processing may be performed based on at least a portion of the information communicated during the call. One or more telecommunications processing can be performed, including call forwarding, call waiting, conference calling, virtual office mapping, call number remapping, voice command processing, call archiving, call monitoring, compliance processing, and any other call processing. Compliance processing and call redirection is described in greater detail in U.S. patent application Ser. No. 11/174,288 entitled TELEPHONIC REDIRECTION AND COMPLIANCE PROCESSING filed Jun. 30, 2005 which is incorporated herein by reference.

Figure 1:
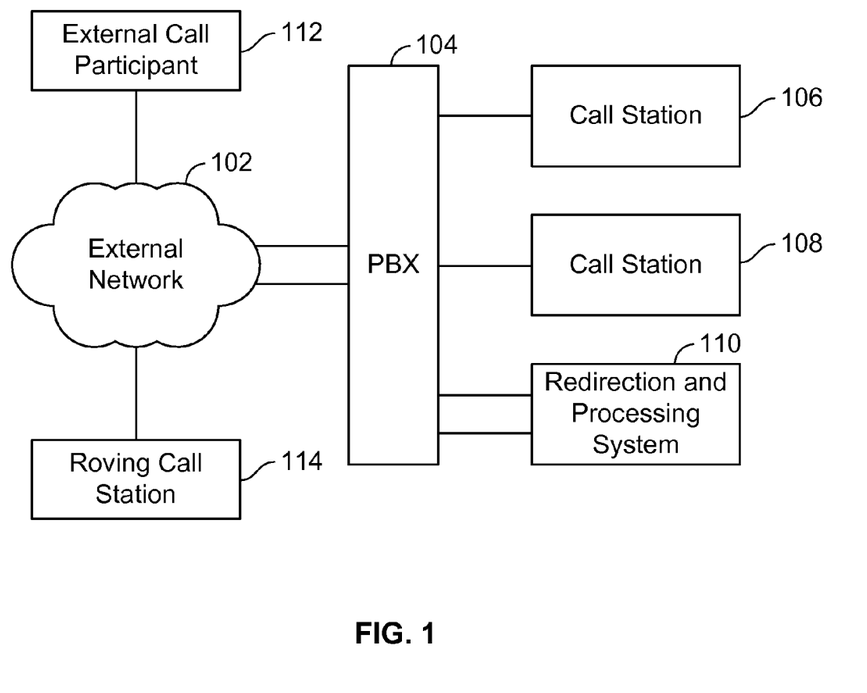
FIG. 1 is a block diagram illustrating an embodiment of a telecommunications redirection and processing system in a PBX environment.

FIG. 1 is a block diagram illustrating an embodiment of a telecommunications redirection and processing system in a PBX environment. Call station 106, call station 108, and redirection and processing system 110 are connected to PBX 104. Any number of call stations may exist. External call participant 112, roving call station 114, and PBX 104 are connected to external network 102. Any number of external call participants and roving call stations may exist. External network 102 may include one or more of the following: a direct or indirect physical communication connection, mobile communication network, public switched telephone network, PBX phone network, Voice-over-IP network, Internet, intranet, LAN, WAN, and any other forms of connecting two or more systems together. PBX 104 routes calls between any devices connected to the PBX and also routes calls to and from external network 102.

Call stations 106, 108, and 114 are associated with redirection and processing system 110. Roving call station 114 includes any associated call stations not directly connected to PBX 104, including mobile telephones, telephones at a remote fixed location, computers, pagers, personal digital assistants, and/or any devices able to send and receive telephonic data. Redirection and processing system 110 redirects and/or processes calls to and from the associated call stations. For example, a call to or from one the associated call stations is received at system 110. System 110 terminates a new call to an intended destination of the received call, and the received call is conferenced with the new call. Since system 110 serves as the redirection point, system 110 is able monitor information communicated during the call. Various processing based on at least a portion of the communicated information during the call can be performed.

External call participant 112 is one of one or more communication participants that may communicate with a call station. External call participant 112 is external to system 110 since the call participant is not directly associated with system 110, i.e., the external communication participant may not utilize redirection and processing features of system 110 while communicating with a call participant not associated with system 110. In some embodiments if external call participant 112 is communicating with an associated call station, call participant 112 is able to utilize at least a portion of the features of the redirection and processing system.

In some embodiments the redirection and processing system is not connected to a PBX. In some embodiments, redirection is performed without the assistance of a PBX. Another redirection and routing device may be associated with the redirection and processing system or complete redirection and routing functionality may be included in the redirection and processing system. In some embodiments, the redirection and processing system is directly connected to an external network.

Figure 2:
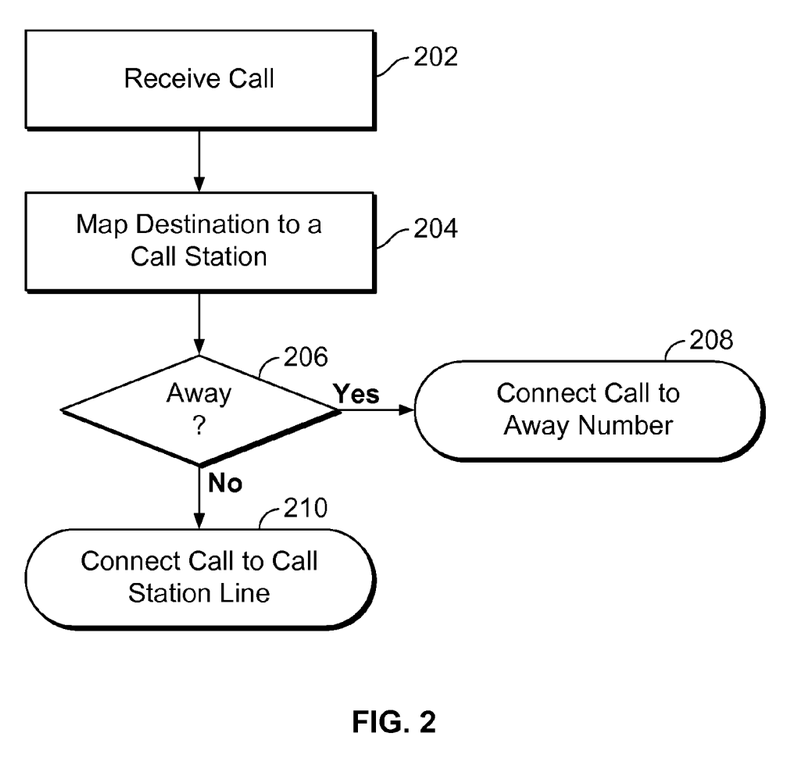
FIG. 2 is a flow chart illustrating an embodiment of a process for redirecting a received call.

FIG. 2 is a flow chart illustrating an embodiment of a process for redirecting a received call. This process may be implemented on a redirection and processing system, e.g., system 110 of FIG. 1. At 202, a call is received. The call may be received from any call participant, including an external call participant or a call station. The call may be received by another system, e.g., PBX, before being received at a redirection and processing system. At 204, the destination of the call is mapped to a call station. In some embodiments, mapping to the call station includes determining a destination call number and mapping the call number to a call station. For example, a call participant dials a call number to reach a call station. A call number may be a telephone number, extension number, IP address, or any numeric, alphabetic, or alphanumeric identifier. The call is received by the redirection and processing system on a line associated with the destination call station. The received call is mapped to the destination call station associated with the line. At 206, it is determined if the call station should be forwarded to an away call number. The determination may be made at least in part by using an away indicator that is preconfigured or dynamically configured. The away number corresponds to a call number at which a user associated with the call station may be reached when the user may be unreachable at the destination call station. The user may be a person or device able to communicate information during the call. In some embodiments, the away number may be a preconfigured number to which calls to a destination call station are forwarded when a user associated with the destination call station is not reachable at the destination call station. In some embodiments, the away number is configured dynamically, e.g., by a user providing a number to which calls placed to a destination call station with which the user is associated should be forwarded. Any number of away numbers may exist. For example, when the user associated with the destination call station is away from the call station, the user indicates to the redirection and processing system that the user may be reached at a specified away number. The specified number may be any arbitrary number, or in some embodiments it may be selected from a preconfigured list of away numbers associated with the user. If at 206 the destination call station is determined to be away, at 208 the received call is connected to the away call number. If the call station is not determined to be away, the call is connected to the destination call station line at a call number directly associated with the destination call station.

In some embodiments, connecting the received call includes establishing a new call to either the away call number or the destination call station number, as applicable, and conferencing the received call with the new call. In some embodiments, connecting the received call is handled at least in part by a system not directly involved in call redirection and processing as described herein, e.g., a PBX system. Connecting a received call as a conference call in some embodiments is used to facilitate monitoring information transferred during the call. In some embodiments after connecting the received call to the destination, the call is not necessarily monitored. In some embodiments, if the call to the destination call station number is not received by a user, the call is forwarded one or more away numbers associated with the call station. For example, if no user picks up the call to the destination call station, successive new calls are made to away numbers associated with the user until the user picks up the call. If the user does not answer at any number associated with the user, the call may be connected to a voice mail system. In some embodiments, the received call is connected to voice mail without attempting any connections. In some embodiments, Caller ID data is modified to allow the call participants to be unaware of the communication redirection.

Figure 3:
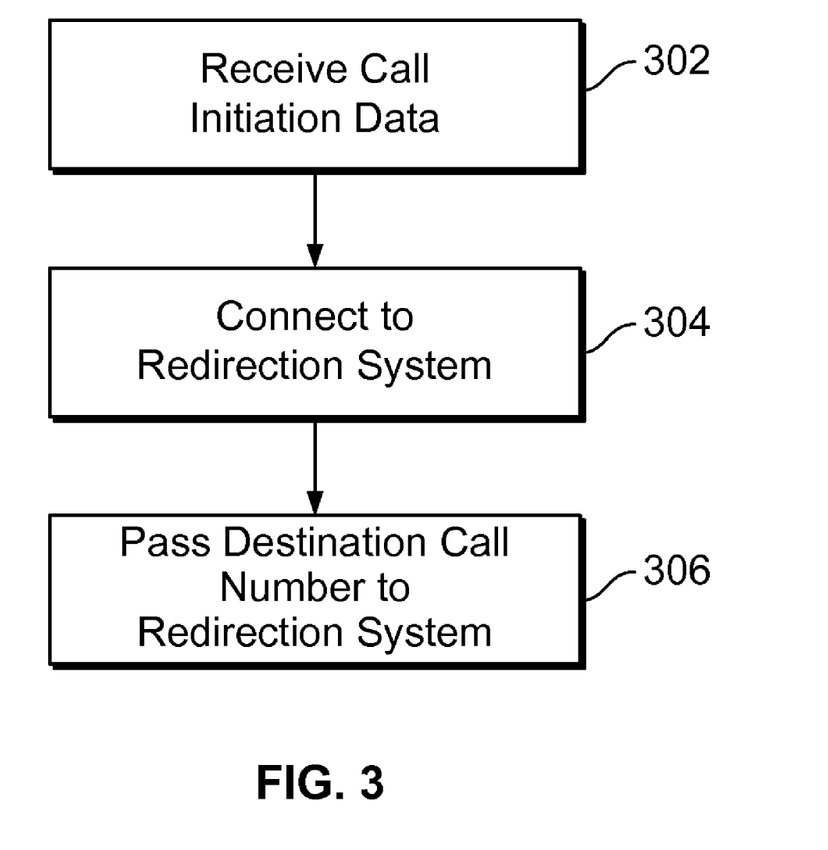
FIG. 3 is a flow chart illustrating an embodiment of a process for handling a call initiation.

FIG. 3 is a flow chart illustrating an embodiment of a process for handling a call initiation. The process may be implemented on PBX 104 of FIG. 1. At 302, call initiation data is received from a call station. Call initiation data may include one or more of the following: phone on/off-hook data, hook flash data, DTMF (Dual-Tone Multi-Frequency) data, communication handshake data, binary data, voice data, and any data used to indicate a call station wishes to establish a call. At 304, the call initiator is connected to the redirection system. The connection may be established through a call or any communications connection. At 306, a call number associated with a desired destination of the call is passed to the redirection system. The call number may be passed as a single or a combination of data encodings, including rotary pulse, DTMF, and binary data. In some embodiments, at 306, a redirection prompt requests the call initiator for a call number associated with a desired destination. The prompt may be a voice prompt, UI (User Interface) prompt, communication handshake prompt, or any other form of indicating to the call initiator that the redirection system is ready to receive a destination call number.

Figure 4:
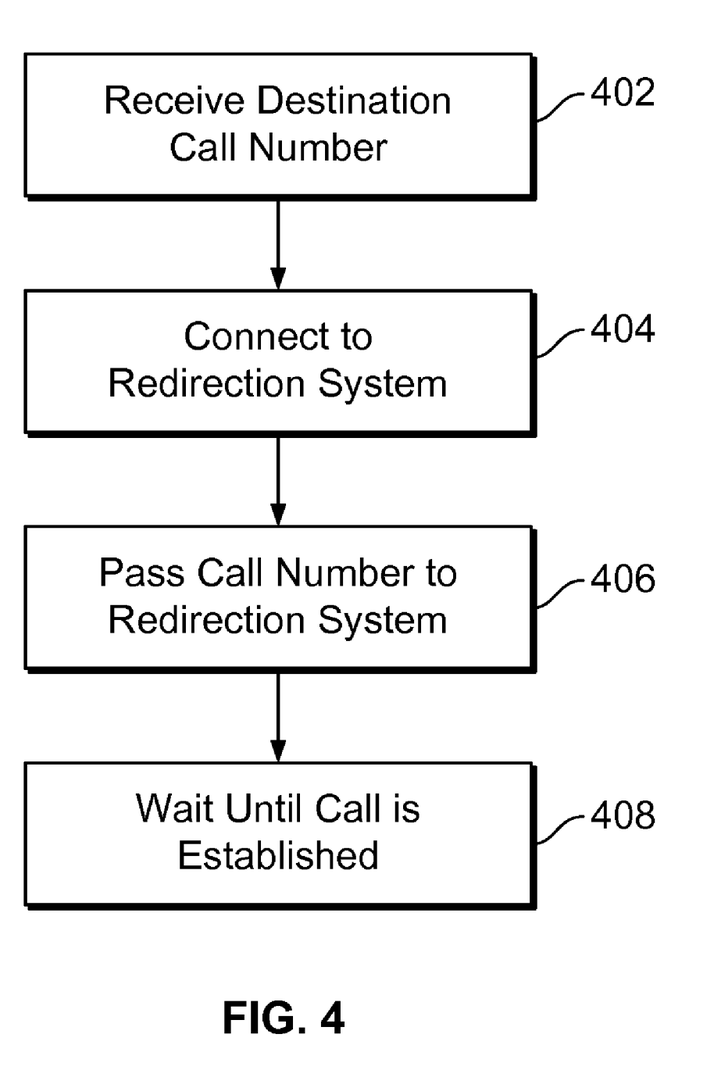
FIG. 4 is a flow chart illustrating an embodiment of a process for establishing a call to a destination call number.

FIG. 4 is a flow chart illustrating an embodiment of a process for establishing a call to a destination call number. The process may be implemented on a device associated with call stations 106, 108, or 114 of FIG. 1. At 402, a destination call number is received. In some embodiments, the destination number is received from a user associated with a call station. At 404, a connection is established to the redirection system. In some embodiments, a call is made to the redirection system to a call number associated with the redirection system. At 406, the received destination call number is passed to the redirection system. At 408, the process waits for a call destination associated with the passed call number to be conferenced into the connection. Once the destination is conferenced, the call initiator's call to the destination call number has been established. Since the redirection and processing system can monitor the information transferred in the call, processing can be performed on at least a portion of the communication. In some embodiments, if an equipment configured to perform the process of FIG. 4 is used to initiate a call, call redirection and processing as described herein may be performed without requiring any modification to the operation of a PBX with which the equipment is associated, e.g., in an embodiment in which a PBX is used to route calls between the calling equipment and the redirection system, because the PBX merely connects the call as normal to a line associated on the PBX with the dialed (or otherwise entered) identifier associated with the redirection and processing system.

In some embodiments, the redirection and processing system comprises at least in part the telephone or other equipment used to initiate the call.

Figure 5:
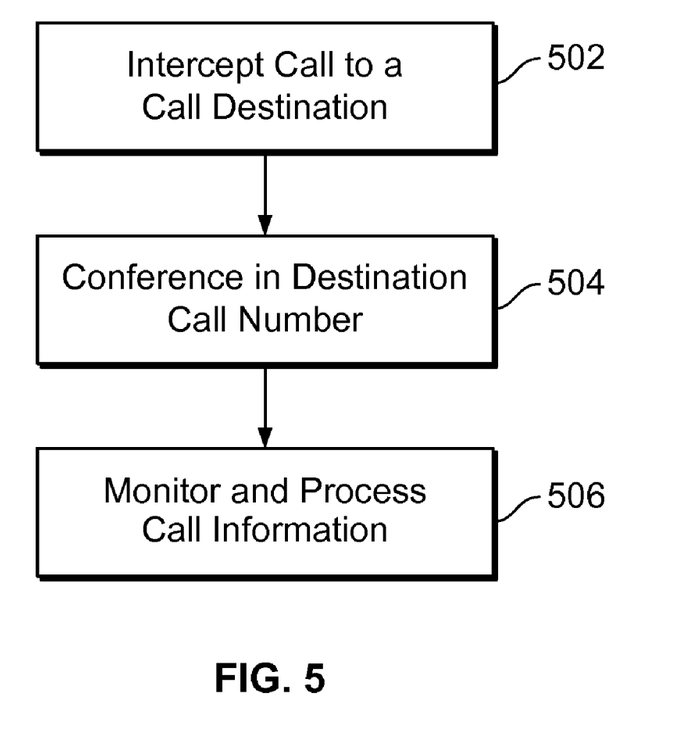
FIG. 5 is a flow chart illustrating an embodiment of a process for monitoring and processing call information.

FIG. 5 is a flow chart illustrating an embodiment of a process for monitoring and processing call information. The process may be implemented on redirection and processing system 110 of FIG. 1. At 502, a call to an intended destination is intercepted. The received call may be an intercepted call request incoming to a call station or outgoing call from a call station. Intercepting the call includes receiving a call from a call station or receiving a call intended for a call station. At 504, the intended destination associated with the received call is conferenced with the intercepted call. Conferencing the call includes establish a new call to the intended destination and allowing communication between the call initiator and the intended destination. The intended destination may be determined from a destination call number received in association with intercepting the call or determined from a communication line associated with the intercepted call. At 506, call information transferred during the call is monitored and processed. Information transferred in the call may include voice data (including conversation content and tone/character/accent/gender of voice), background call noise, any audible data, any binary data, data associated with devices of with call participants, data associated with communication service providers, data associated with routing devices, and/or data associated with other devices associated with the redirection and processing system. In some embodiments, call information is optionally monitored and processed.

In some embodiments, call waiting processing is performed. During a original communication session, a call request to at least one of the original communication participants from a new calling party is received at the redirection node. The redirection node signals to the destination communication participant that another communication request from a new calling party has been received. The requested communication participant may ignore the request or indicate to the redirection node place the original communication on hold and establish communication with the new calling party. Any indication, including voice command, user command, key command, UI command, DTMF command, on/off hook command, and/or hook flash command may be used to indicate to the redirection node. In some embodiments if the new call request is ignored, the new call requester is connected to voice mail. In some embodiments, an indication is sent to the redirection node to ignore the new call request. In some embodiments, placing the original communication on hold includes not allowing voice communication between the original communication participants. In some embodiments, a conference call between two or more original communication participants and the new calling party is established.

Figure 6:
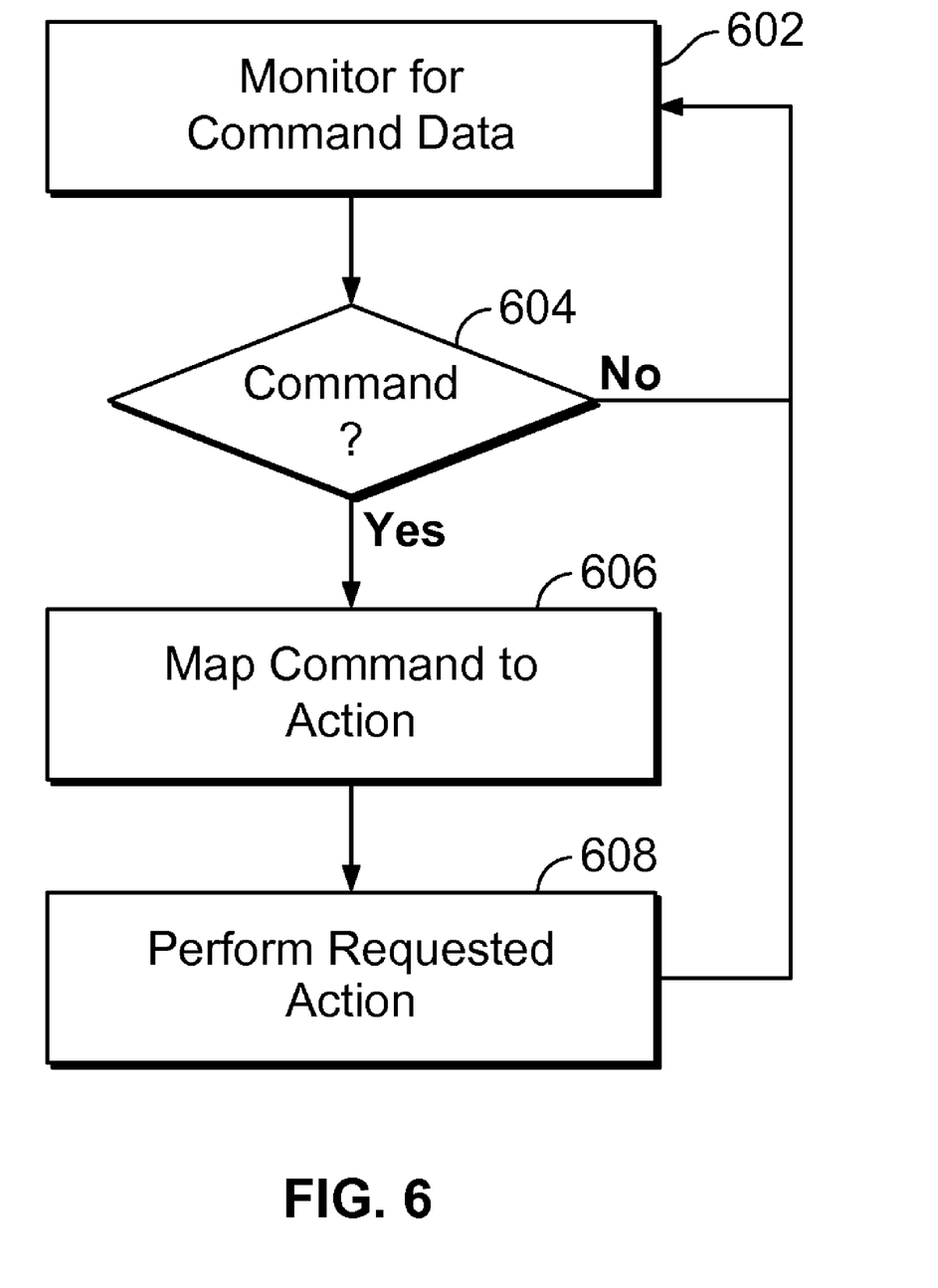
FIG. 6 is a flow chart illustrates an embodiment of a process for performing requested actions during a call.

FIG. 6 is a flow chart illustrates an embodiment of a process for performing requested actions during a call. The process may be implemented on redirection and processing system 110 of FIG. 1. In some embodiments, at 506 of FIG. 5, monitoring and processing call information includes the process of FIG. 6. At 602, communication information is monitored for command data. In various embodiments, command data includes one or more of voice commands, user command, key command, UI command, DTMF command, on/off hook command, hook flash command, or any identifier associated with a processing action. For example processing features such as call forwarding, conference calling, virtual office mapping, call number remapping, call archiving, call monitoring, compliance processing, directory assistance retrieval, other data retrieval, and any other call processing features can be invoked, modified, configured, or stopped by invoking command data. At 604 if command is not detected, at 602, call information is monitored. At 604 if a command data has been detected, at 606, the command data is mapped to a processing action. In some embodiments, an indication a command data will be communicated is communicated before a command data is communicated. At 608, the mapped processing action is performed, and at 602, call information is monitored for command data. In some embodiments, the process of FIG. 6 is implemented on a call redirection and processing system that is operated and/or controlled by an enterprise or third party vendor associated with a monitored call station participating in the call, which enables enhanced services such as the process features described above to be provided without requiring special equipment, handling, or service from a telephone or other telecommunication service provider nor any modification of any underlying telephone or telecommunication service provider network.

Figure 7:
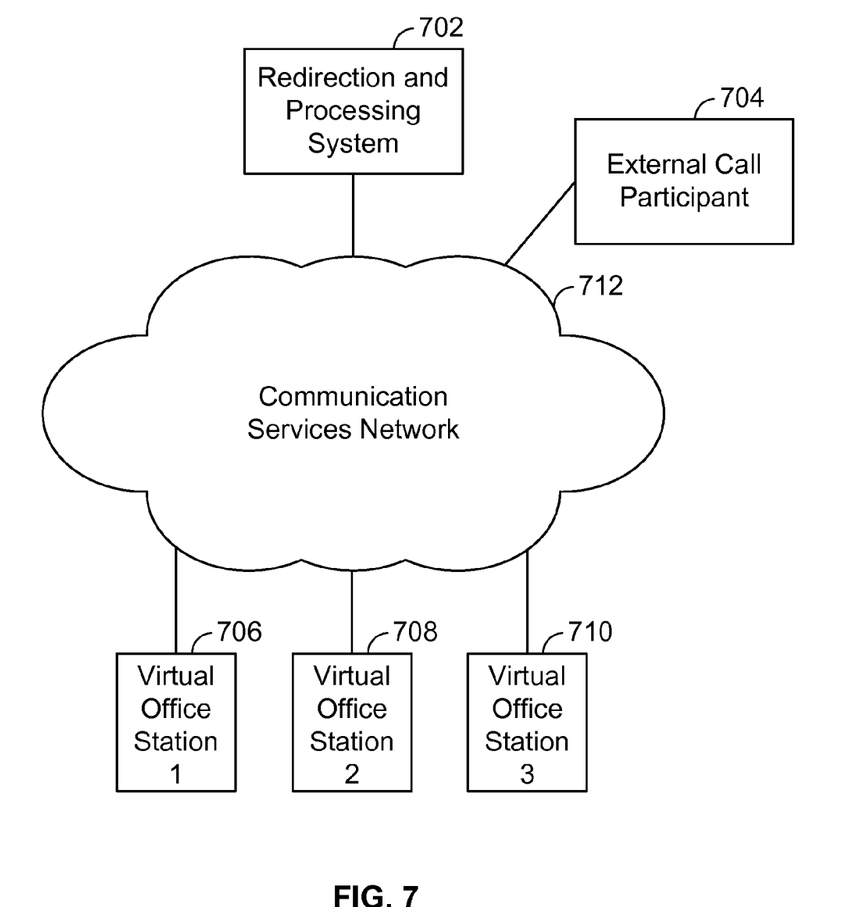
FIG. 7 is a block diagram illustrating an embodiment of a virtual office environment.

FIG. 7 is a block diagram illustrating an embodiment of a virtual office environment. Redirection and processing system 702, external call participant 704, virtual office call station 1 (706), virtual office call station 2 (708), and virtual office call station 3 (710) are all connected together through communication services network 712. Any number of redirection and processing systems, external call participants, and virtual office call stations may exist. One or a combination of networks comprise the communication services network, including without limitation, a direct or indirect physical connection, mobile communication network, public switched telephone network, PBX phone network, Voice-over-IP network, Internet, intranet, LAN, WAN, and/or any other forms of connecting two or more systems together. Virtual office call stations include roving and/or non-roving call stations associated with a redirection and processing system.

Often it is desirable to have features associated with a common user entity controlled communications network in call stations not physically located in the same common sub-communications network. PBX systems can offer functionality such as common phone numbers for multiple call stations, dial by extension, dynamic call number mapping, extension number mapping, call forwarding, and conference calling for call stations directly connected to the PBX. This requires a direct connection to the PBX, and call stations located in physically different sub-network configurations cannot take advantage of similar features. Virtual private network and similar technologies may be used to provide such functionality, but normally one must contract with a telephone or other telecommunications service provider for such services, which may be more expensive and/or less flexible. Also, the telecommunications service provider may not offer all of the functionality a particular user or set of users may desire, or the provider may not bundle or price services in the particular way desired. By allowing all calls to and/or from virtual office call stations to be redirected through a redirection and processing system such as described herein, a "virtual office" can be setup where call stations physically located in the same or different sub-networks and/or in the same or different physical or geographic locations can be virtually connected together through the redirection and processing system, without necessarily requiring a PBX (or in any event not requiring a specially configured PBX) and without necessarily requiring enhanced services from a telecommunications service provider used to connect calls or changes to such a service provider's infrastructure. For example, when external call participant 704 dials a call number to reach virtual office call station 1 (706), e.g., a "public" number provided and/or advertised as being associated with virtual office call station 1, the call in some embodiments is received by system 702, e.g., because the dialed number is in fact associated with the redirection and processing system 702 on the communication services network 712. The redirection and processing system 702 redirects the call to virtual office call station 1, e.g., by conferencing virtual office station 1 into the original call using a number associated with station 1 on the communication services network (e.g., a "non-public" number that can be used to terminate a call to station 1 (706) via the communication services network 712. Since system 702 is in a position to potentially monitor all calls associated with the virtual office call stations, any redirection and processing functionality can be offered. Redirection and processing functionality may include, PBX-like functionality, common phone numbers for multiple call stations, dial by extension, dynamic call number mapping, extension number mapping, call forwarding, conference calling, and call hunt group calling. In some embodiments call hunt group calling includes rerouting a call to one or more stations in a list of call stations if an intended recipient does not answer a call after a certain number of rings or a certain amount of time. Calls may be routed other stations on the list until a station answers the call, all of the stations on the list have been called, voicemail is called, the call initiator requests voicemail, or the call initiator requests a specific station. The call hunt group list may be preconfigured or dynamically configured. The call hunt group list may be finite (e.g., the list is traversed once) or circular (e.g., the list traversed multiple times). The traversal order of the list may be predefined, dynamically defined, or random. In some embodiments, the process of FIG. 4 is implemented in virtual office call stations 706-710. In some embodiments, the process of FIG. 5 is implemented in redirection and processing system 702.

For example, in some embodiments, external call participant 704 would complete a call to virtual office station 1 (706) by dialing a number that is associated with station 1 but in fact results in a call being terminated with the redirection and processing system 702, e.g., because the dialed number is in fact associated on communication services network 712 with system 702. System 702 recognizes the call as being associated with station 1, e.g., by virtue of the line on which the call came in, and conferences station 1 (706) into the call received by system 702 from external call participant 704. By entering a command during the call, station 1 (706) or a user associated there with can cause the system 702 to perform such PBX and/or VPN like functions such as conferencing in or forwarding the received call to another virtual office station. In some embodiments the other station to be conferenced in or to which the call is to be forwarded may be indicated using an extension number or other identifier associated with the other station, instead of providing the complete number by which the station is known, e.g., reachable directly, on the communication services network 712. Any number of services and features that would otherwise require additional services from and/or modification of the provider network of a telecommunications service provider can be provided in an inexpensive, flexible, and locally controlled manner using the techniques described herein.

Figure 8:
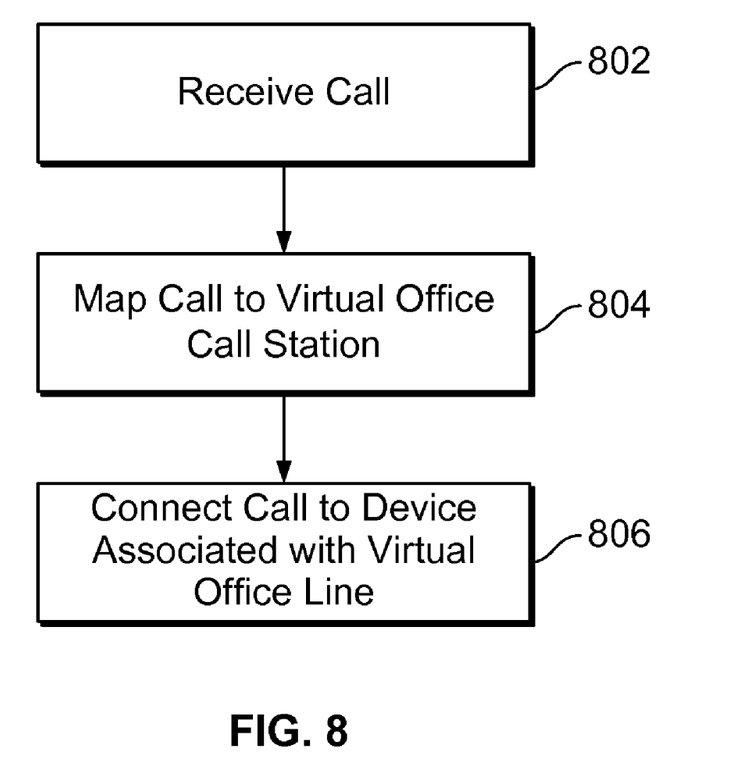
FIG. 8 is a flow chart illustrating an embodiment of a process for connecting to a device associated with a virtual office call station.

FIG. 8 is a flow chart illustrating an embodiment of a process for connecting to a device associated with a virtual office call station. The process may be implemented on system 702 of FIG. 7. At 802, a call is received. At 804, the call is mapped to a virtual office call station. In some embodiments, mapping includes determining the destination virtual office call station and determining a call number that can be used to reach the virtual office call station. Determining the destination virtual office call station may include determining at which line the call was received and/or receiving an extension number from the call initiator. At 806, the call is connected to a device associated with the intended virtual office call station. Connecting the call may include calling the destination virtual office call station at the determined call number and allowing communication between the call initiator and the destination virtual office call station.

The processes shown in FIGS. 2, 3, 4, 5, 6, and 8 and described above may be implemented in any suitable way, such as one or more integrated circuits and/or other device, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a communication, comprising:
receiving at a redirection node from a requesting communication participant a first request to establish communication;
determining a destination communication participant associated with the request;
establishing a communication session in which the requesting communication participant, the redirection node, and the destination communication participant are participants at the same time, including by sending from the redirection node to an equipment associated with the destination communication participant a second request to establish communication between the redirection node and the equipment associated with the destination communication participant;
making available to at least one of the requesting communication participant and the destination communication participant, after the communication session is established in which the requesting communication participant, the redirection node, and the destination communication participant are participants at the same time, a communication session processing feature not provided with respect to the communication session by a telecommunication service provider associated with a service provider network used to establish and provide the communication session, and wherein the redirection node is not operated by the telecommunication service provider; and
modifying Caller ID data to allow at least one of the communication participants to be unaware that the redirection node is a participant in the communication session.

2. The method as recited in claim 1, wherein the communication session processing feature includes one or more features selected from the group consisting of: call forwarding, call waiting, extension dialing, conference calling, call transfer, call number remapping, voice command processing, call archiving, call monitoring, compliance processing, call recording, call indexing, analyzing a call, controlling a call, blocking a call, and modifying a call.

3. The method as recited in claim 1, wherein the participation of the redirection node is transparent to at least one of the requesting communication participant and the destination communication participant.

4. The method as recited in claim 1, wherein the redirection node is associated with a PBX system.

5. The method as recited in claim 1, wherein the communication participants include any user, system, or device involved in the communication.

6. The method as recited in claim 1, wherein the destination communication participant is a call station associated with the redirection node and the redirection node is configured to redirect to the call station calls associated with the call station.

7. The method as recited in claim 1, wherein the first request comprises a call placed to a number associated by the requesting call participant with the destination call participant.

8. The method as recited in claim 7, wherein the number is associated by the telecommunication service provider with the redirection node.

9. The method as recited in claim 7, wherein the number comprises one or more of the following: a telephone number; an extension number; an IP address; and any numeric, alphabetic, or alphanumeric identifier.

10. The method as recited in claim 1, wherein the requesting communication participant is a call station associated with the redirection node and at least selected calls from the call station are redirected to the redirection node.

11. The method as recited in claim 1, wherein the request to establish communication includes initiating a telephonic call.

12. The method as recited in claim 1, wherein the service provider network comprises one or more of the following: a direct or indirect physical connection, a mobile communication network, a public switched telephone network, a phone network, Voice-over-IP network, Internet, intranet, LAN, WAN, and any other forms of connecting two or more systems together.

13. The method as recited in claim 1, wherein determining a destination communication participant associated with the request includes one or more of the following: determining a communications line from which the call was received, prompting the requesting call participant for a destination call number, and receiving from the requesting communication participant a destination call number.

14. The method as recited in claim 1, wherein establishing a communication session includes calling the destination call participant at a call number associated with the destination call participant.

15. The method as recited in claim 1, wherein establishing a call to the destination communication participant includes forwarding the call to one or more away call numbers.

16. The method as recited in claim 1, further comprising detecting a command, mapping the command to a processing action associated with the communication session processing feature, and performing the processing action.

17. The method as recited in claim 16, wherein the command includes one or more of the following: a voice command, a user command, a keypad entry, a command entered using a user interface, a DTMF command, an on/off hook command, a hook flash command, or any action or data associated with a processing action.

18. The method as recited in claim 16, wherein performing the processing action includes invoking, modifying, configuring, and/or stopping the communication session processing feature.

19. The method as recited in claim 1, wherein the communication session processing feature comprises providing virtual private exchange processing with respect to two or more associated communication participants, including one or more of the following: common phone number mapping for multiple call stations, extension dialing, dynamic, call number mapping, extension number mapping, call forwarding, call waiting, conference calling, and call hunt group calling.

20. A system for telecommunications processing, comprising:
a communications interface configured to receive from a requesting communication participant a first request to establish communication; and
a processor configured to determine a destination communication participant associated with the request, establish a communication session in which the requesting communication participant, the system, and the destination communication participant are participants at the same time, including by sending from the redirection node to an equipment associated with the destination communication participant a second request to establish communication between the redirection node and the equipment associated with the destination communication participant, make available to at least one of the requesting communication participant and the destination communication participant, after the communication session is established in which the requesting communication participant, the redirection node, and the destination communication participant are participants at the same time, a communication session processing feature not provided with respect to the communication session by a telecommunication service provider associated with a service provider network used to establish and provide the communication session, and modify Caller ID data to allow at least one of the communication participants to be unaware that the redirection node is a participant in the communication session, and wherein the redirection node is not operated by the telecommunication service provider.

21. The system as recited in claim 20, wherein the communication session processing feature includes one or more features selected from the group consisting of: call forwarding, call waiting, extension dialing, conference calling, call transfer, call number remapping, voice command processing, call archiving, call monitoring, compliance processing, call recording, call indexing, analyzing a call, controlling a call, blocking a call, and modifying a call.

22. The system as recited in claim 20, wherein the participation of the redirection node is transparent to at least one of the requesting communication participant and the destination communication participant.

23. The system as recited in claim 20, wherein the system is associated with a PBX system.

24. The system as recited in claim 20, wherein the processor configured to determine a destination communication participant associated with the request includes configurations to perform one or more of the following: determine a communications line from which the call was received, prompt the requesting call participant for a destination call number, and receive from the requesting communication participant a destination call number.

25. The system as recited in claim 20, wherein the processor is further configured to detect a command, map the command to a processing action associated with the communication session processing feature, and perform the processing action.

26. The system as recited in claim 20, wherein the communication session processing feature comprises providing virtual private exchange processing with respect to two or more associated communication participants, including one or more of the following: common phone number mapping for multiple call stations, extension dialing, dynamic, call number mapping, extension number mapping, call forwarding, call waiting, and conference calling.

27. A computer program product for processing a communication, the computer program product being embodied in a non-transitory computer readable medium and comprising computer instructions for:
  receiving at a redirection node from a requesting communication participant a first request to establish communication;
  determining a destination communication participant associated with the request;
  establishing a communication session in which the requesting communication participant, the redirection node, and the destination communication participant are participants at the same time, including by sending from the redirection node to an equipment associated with the destination communication participant a second request to establish communication between the redirection node and the equipment associated with the destination communication participant;
  making available to at least one of the requesting communication participant and the destination communication participant, after the communication session is established in which the requesting communication participant, the redirection node, and the destination communication participant are participants at the same time, a communication session processing feature not provided with respect to the communication session by a telecommunication service provider associated with a service provider network used to establish and provide the communication session, and wherein the redirection node is not operated by the telecommunication service provider; and
  modifying Caller ID data to allow at least one of the communication participants to be unaware that the redirection node is a participant in the communication session.

28. The computer program product as recited in claim 27, wherein the communication session processing feature includes one or more features selected from the group consisting of: call forwarding, call waiting, extension dialing, conference calling, call transfer, call number remapping, voice command processing, call archiving, call monitoring, compliance processing, call recording, call indexing, analyzing a call, controlling a call, blocking a call, and modifying a call.

29. The computer program product as recited in claim 27, wherein determining a destination communication participant associated with the request includes one or more of the following: determining a communications line from which the call was received, prompting the requesting call participant for a destination call number, and receiving from the requesting communication participant a destination call number.

30. The computer program product as recited in claim 27, wherein the communication session processing feature comprises providing virtual private exchange processing with respect to two or more associated communication participants, including one or more of the following: common phone number mapping for multiple call stations, extension dialing, dynamic, call number mapping, extension number mapping, call forwarding, call waiting, and conference calling.

* * * * *